(12) United States Patent
Byers

(10) Patent No.: US 8,781,996 B2
(45) Date of Patent: Jul. 15, 2014

(54) SYSTEMS, METHODS AND COMPUTER PROGRAM PRODUCTS FOR SEARCHING WITHIN MOVIES (SWIM)

(75) Inventor: Simon D. Byers, Summit, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 673 days.

(21) Appl. No.: 12/167,831

(22) Filed: Jul. 3, 2008

(65) Prior Publication Data

US 2009/0019009 A1    Jan. 15, 2009

Related U.S. Application Data

(60) Provisional application No. 60/949,389, filed on Jul. 12, 2007.

(51) Int. Cl.
*G06F 17/30*     (2006.01)

(52) U.S. Cl.
USPC .......................................... 707/602; 707/688

(58) Field of Classification Search
USPC ................................................ 707/602, 688
See application file for complete search history.

(56) References Cited

U.S. PATENT DOCUMENTS

| | | | |
|---|---|---|---|
| 5,481,296 A | 1/1996 | Cragun et al. | |
| 5,659,742 A | 8/1997 | Beattie et al. | |
| 5,703,655 A | 12/1997 | Corey et al. | |
| 5,786,814 A | 7/1998 | Moran et al. | |
| 5,794,249 A | 8/1998 | Orsolini et al. | |
| 5,835,667 A | 11/1998 | Wactlar et al. | |
| 6,104,861 A | 8/2000 | Tsukagoshi | |
| 6,262,775 B1 | 7/2001 | Kim | |
| 6,360,234 B2 | 3/2002 | Jain et al. | |
| 6,418,271 B1 * | 7/2002 | Cookson et al. | ................ 386/95 |
| 6,430,357 B1 | 8/2002 | Orr | |
| 6,463,444 B1 | 10/2002 | Jain et al. | |
| 6,473,778 B1 * | 10/2002 | Gibbon | ........................ 715/201 |
| 6,567,980 B1 | 5/2003 | Jain et al. | |
| 6,580,437 B1 | 6/2003 | Liou et al. | |
| 6,636,238 B1 | 10/2003 | Amir et al. | |

(Continued)

FOREIGN PATENT DOCUMENTS

| | | | |
|---|---|---|---|
| EP | 0 903 676 A2 | 3/1999 | |
| EP | 1 043 665 A2 | 10/2000 | |

OTHER PUBLICATIONS

Perey, Christine, "A card catalog for your multimedia; Repurpose your video assets to save money or make new revenue", Network World, p. 71, Sep. 10, 2001, four pages.

(Continued)

*Primary Examiner* — Son T Hoang

(57) ABSTRACT

Systems, methods and computer-readable media process a series of media files into a searchable format. The method includes generating a media database by processing each of a plurality of programs. The steps of the method include extracting a subtitle track from each of the programs, retrieving at least one frame associated with the subtitle track, adding metadata to the extracted subtitle track and at least one frame, processing the subtitle track, program statistics and at least one frame in a media database. Another aspect includes receiving a user query associated with dialog in a program, searching the media database and presenting a listing of results, receiving a user selection or program from their listing and transmitting at least one frame, a portion of associated subtitle track and prompts for ordering the program.

22 Claims, 12 Drawing Sheets

(56) References Cited

U.S. PATENT DOCUMENTS

| | | | |
|---|---|---|---|
| 6,697,796 B2 | 2/2004 | Kermani | |
| 6,782,380 B1 | 8/2004 | Thede | |
| 6,901,207 B1 | 5/2005 | Watkins | |
| 6,922,691 B2 | 7/2005 | Flank | |
| 2002/0078452 A1* | 6/2002 | Devara | 725/44 |
| 2002/0170062 A1 | 11/2002 | Chen et al. | |
| 2004/0122811 A1 | 6/2004 | Page | |
| 2004/0125877 A1* | 7/2004 | Chang et al. | 375/240.28 |
| 2004/0263621 A1 | 12/2004 | Guo et al. | |
| 2005/0022252 A1 | 1/2005 | Shen | |
| 2005/0097080 A1 | 5/2005 | KethiReddy et al. | |
| 2005/0117884 A1 | 6/2005 | Kang et al. | |
| 2005/0198006 A1 | 9/2005 | Boicey et al. | |
| 2006/0021060 A1* | 1/2006 | Fujinami et al. | 726/26 |
| 2006/0140588 A1* | 6/2006 | Kim | 386/95 |
| 2006/0236338 A1* | 10/2006 | Shimoda | 725/37 |
| 2006/0271594 A1 | 11/2006 | Haberman | |
| 2007/0061352 A1* | 3/2007 | Dimitrova et al. | 707/102 |
| 2007/0061845 A1* | 3/2007 | Barnes | 725/62 |
| 2007/0098350 A1 | 5/2007 | Gibbon et al. | |
| 2007/0136755 A1 | 6/2007 | Sakai | |
| 2007/0154171 A1 | 7/2007 | Elcock et al. | |
| 2007/0203945 A1* | 8/2007 | Louw | 707/104.1 |
| 2007/0204288 A1* | 8/2007 | Candelore | 725/28 |
| 2007/0253678 A1* | 11/2007 | Sarukkai | 386/95 |
| 2008/0192129 A1* | 8/2008 | Walker et al. | 348/231.2 |

OTHER PUBLICATIONS

Gustavson, Ron, "Sorting Through Digital Asset Management" (Industry Overview, *Tape-Disc Business*, vol. 15, No. 9, p. 22, Sep. 2001, three pages.

Gilmer, Brad, "Media asset management", *Broadcast Engineering*, vol. 44, No. 7, p. 34, Jul. 2002, 3 pages.

Fuller, Chuck, "Virage Developer Program Overview", Developer Relations, Virage. Mar. 2002; nine pages.

Foote, J. "An Overview of Audio Information Retrieval" Multimedia Systems, ACM, New York, NY, US, vol. 7, No. 1, Jan. 1999, pp. 2-10, XP002221393 ISSN:0942-4962 p. 7, line 22-p. 8, line 4; figures 3.

Google Print, About Google Print (Beta) (http://web.archive.org/web/20041012082109/http://print.google.com/), Oct. 12, 2004, 1-7.

A9, "7 Reasons to Use A9.com" (http://web.archive.org/web/20040417170253/http://a9.com/) Apr. 17, 2004, 1-3.

Technology Briefing, "Technology Briefing | Internet: Google Begins Book-Excerpt Technology", http://query.nytimes.com/gst/fullpage.html?res=9C05E2D9173BF934A35753C1A9629C8B63&fta=y), Oct. 7, 2004, 1-2.

Price, "Amazon Debuts new Book Search Tool" (http://searchenginewatch.com/showPage.html?page=3098831), Oct. 27, 2003, 1-2.

"Virage Introduces Media Management System—Breakthrough Video Cataloging and Media Asset Management Solution", Gale Group Trade & Industry DB (c) 2005 The Gale Group, 09727260 Supplier No. 19752608, *Business Wire*, p. 9150135, Sep. 15, 1997.

Gauvain et al., "Transcribing broadcast news for audio and video indexing", *Communications of the ACM*, vol. 43, No. 2, pp. 64-70, Feb. 2000.

Yoshida, Junko, "MPEG-7 vote to trigger hunt for killer apps (Technology Information)", *Electronic Engineering Times*, p. 1, Aug. 13, 2001.

Datasheet, "VideoLogger Automate Video Encoding and Indexing", Vlrage, 2003.

\* cited by examiner

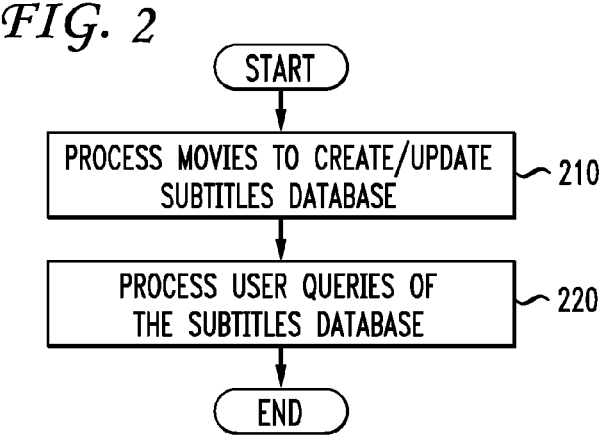
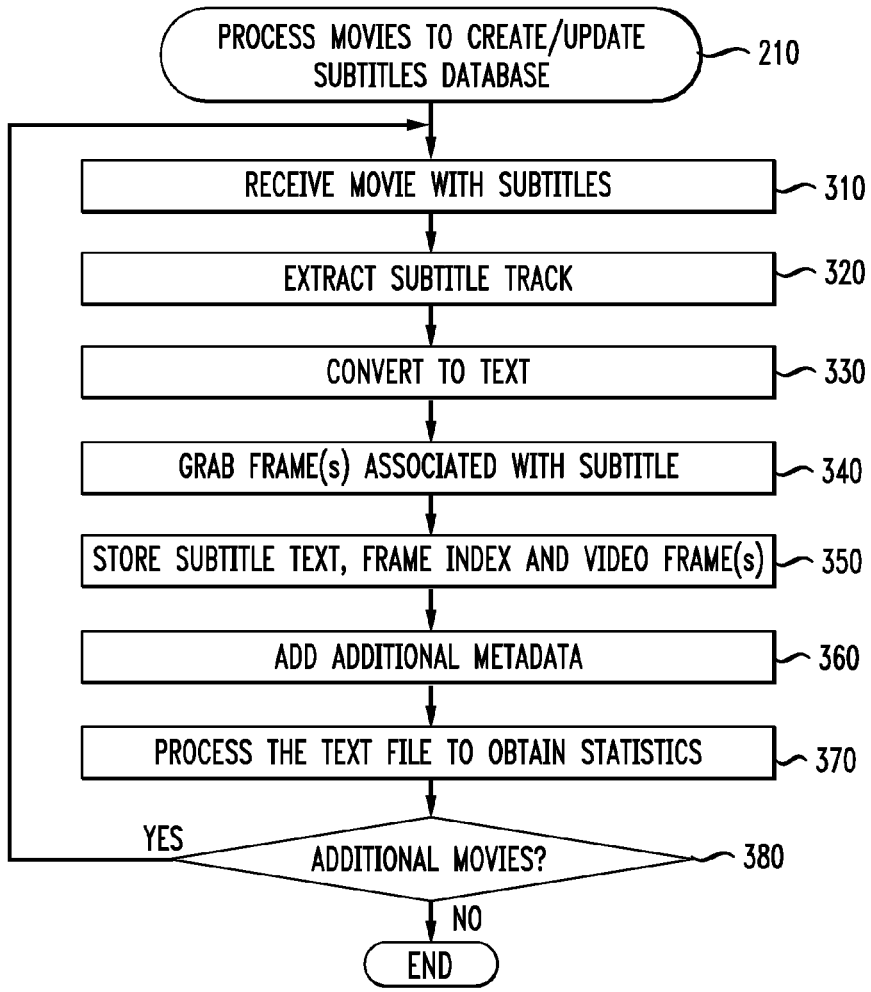

FIG. 5F

Search within Movies - Microsoft Internet Explorer provided by BellSouth http://www.swimdb.com/search File  Edit  View  Favorites  Tool  Help Data 100 entries listed in ascending order of Title
Click a column header to sort by that column,
click it again reverse the order of sorting Results in data table mode. Switch to cover image mode — 550

SWiM

| Title ↑ | Year | Lang | Length | #Lines | Lines/min | Swearosity | Inarticulosity | Words/min | Unique wpm |
|---|---|---|---|---|---|---|---|---|---|
| Round Midnight | 1986 | en | 7880 | 832 | 6.3 | 0.08 | 0.05 | 34.6 | 7.7 |
| Salem's Lot | 2004 | en | 10867 | 2100 | 11.6 | 0.05 | 0.01 | 79.2 | 12.8 |
| *batteries not included | 1987 | en | 6379 | 1028 | 9.7 | 0.05 | 0.12 | 47.8 | 10.8 |
| 45 | 2006 | en | 5844 | 2348 | 24.1 | 4.64 | 0.61 | 125.5 | 15.4 |
| 06/05 | 2004 | en | 7320,98 | 1352 | 11.1 | 0.07 | 0.02 | 61.4 | 12.7 |
| 10 | 1979 | en | 7336 | 1090 | 8.9 | 0.10 | 0.04 | 55.5 | 11.3 |
| 10 Items Less | 2006 | en | 4847 | 1232 | 15.2 | 0.82 | 0.37 | 84.5 | 15.4 |
| 10 Things I Hate About You | 1999 | en | 5859 | 1423 | 14.6 | 0.17 | 0.17 | 102.9 | 19.4 |
| 10,000 Black Men Named George | 2002 | en | 5343 | 1898 | 21.3 | 0.12 | 0.22 | 116.6 | 20.0 |
| 100 Girls | 2000 | en | 5674 | 1748 | 18.5 | 0.10 | 0.07 | 128.8 | 24.2 |
| 101 Dalmatians | 1996 | en | 6173 | 1346 | 13.1 | 0.00 | 0.31 | 65.4 | 13.9 |
| 102 Dalmations | 2000 | en | 6008 | 1437 | 14.4 | 0.00 | 0.69 | 83.9 | 15.6 |
| 11:11 | 2004 | en | 5732 | 1137 | 11.9 | 0.23 | 0.05 | 59.9 | 13.5 |
| 11:14 | 2003 | en | 5156 | 1064 | 12.4 | 1.09 | 0.26 | 60.1 | 11.2 |
| 12 Angry Men | 1957 | en | 5773 | 1304 | 13.6 | 0.01 | 0.11 | 131.8 | 16.8 |

SYSTEMS, METHODS AND COMPUTER PROGRAM PRODUCTS FOR SEARCHING WITHIN MOVIES (SWIM)

PRIORITY CLAIM

The present invention is the non-provisional of U.S. Provisional Application No. 60/949,389, filed Jul. 12, 2007, the content of which is incorporated herein by reference in its entirety.

BACKGROUND OF THE INVENTION

1. Field of the Invention

The present invention relates to managing searches associated with media and more specifically to a system and method of processing media to enable the searching of dialog within the media.

2. Introduction

Movies (motion pictures) have become ubiquitous in society. Movies are made, distributed, studied and discussed worldwide. This worldwide interest has sparked the creation of movie databases, such as the Internet Movie Database (IMDb), which may be found online at imdb.com, and which provides a database of metadata about movies, including a plot outline, a plot summary, a listing of the cast, genre and/or other data about the movie. This metadata may be searched online. However, there is a need in the art for an improved mechanism for searching video or other media.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the needs set forth above and includes systems, methods and computer readable media for processing media to enable a particular type of search. In one aspect, the method includes receiving a media presentation and extracting subtitles from the received media. The method further includes converting this abstracted subtitles and the text data and associating a frame or series of frames with at least one portion of the converted subtitles. Metadata may also be generated either automatically or manually by users such that each portion of the converted subtitles may have additional information about each segment of the media presentation. The subtitle text, metadata, a frame index and associated one or more media frames may then be stored in a searchable format wherein users can submit text searches and receive matching portions of the media presentation and view the associated frame or frames.

In another embodiment, the method relates to generating a media database. The method includes, for each program of a plurality of programs, extracting a subtitle track from the program, retrieving at least one frame associated with the subtitle track, adding metadata to the extracted subtitle track and at least one frame, processing the subtitle track to obtain program statistics and storing the subtitle track, program statistics and at least one frame in the media database. In this way, many statistics regarding the program, such as the number of lines in the media, how intense the swearing is, how many words per minute and so on may be identified as part of the program statistics and presented to a user or utilized in order to present information to a user.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2 illustrates a flowchart of operations associated with an aspect of the invention;

FIG. 3 illustrates another method embodiment;

FIG. 5F illustrates an example listing of search results that is sortable;

DETAILED DESCRIPTION

Figure 1A:
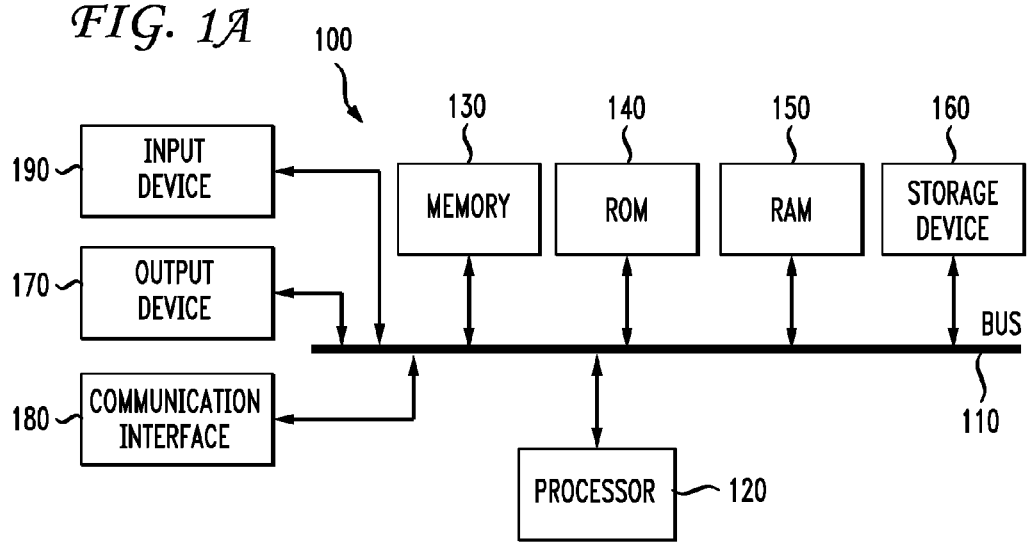
FIG. 1A illustrates an example system embodiment.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions.

These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks. In this regard, an embodiment may refer to a device or computing device itself.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1A, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1A may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Some embodiments of the present invention provide systems, methods and/or computer program products or computer-readable media that allow searching of the dialog of movies by storing the subtitles of the movies in word-searchable form, and allowing queries of the stored text of the subtitles. In contrast with conventional movie databases such as IMDb, which provides storing and searching of metadata about movies, some embodiments of the present invention capture and allow searching of the subtitles themselves. Moreover, in some embodiments, the subtitle queries are not used to navigate a movie but, rather, are used to provide analysis and insight into movies.

As used herein, the term "movies" includes any audio/visual work that includes a subtitles subtrack, and as such may include conventional cinema-released movies that are also released on Digital Video Discs (DVDs) and/or distributed electronically, TV miniseries, made-for-TV movies and/or direct-to-video movies. TV programs and music videos may also be included if they include a subtitles subtrack. As also well known to those having skill in the art, in stored or broadcast movies, subtitles are provided as a separate subtitles subtrack that provides a series of lines of subtitles, and an index to a range of frames where the respective subtitle lines are displayed. For convenience, some embodiments of the present invention will be referred to herein by the acronym SWiM (Searching Within Movies).

Figure 1B:
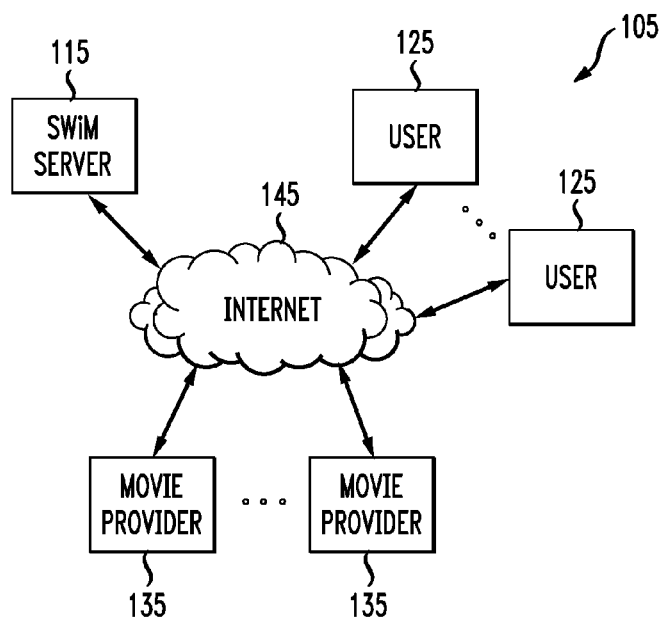
FIG. 1B illustrates a generalized network associated with the principles disclosed herein.

FIG. 1B is a block diagram of systems, methods and/or computer program products for searching movies, according to various embodiments of the present invention. These systems, methods and/or computer program products 105 include a server 115, also referred to herein as a SWiM server, that includes therein a word searchable database of the subtitles subtracks of movies, a plurality of user devices 125, and a plurality of movie provider devices 135 that are connected by a network 145, such as the Internet. The server 115 may comprise one or more enterprise, application, personal and/or pervasive computers that may be interconnected by a network, to provide a centralized or distributed server. The user devices 125 may comprise personal computers, set top boxes, mobile devices and/or other media player devices, and may include a browser interface. The movie provider devices 135 may include one or more servers hosting websites where movies can be ordered for purchase and/or rental, and may include DVD distributors and media shopping websites, such as amazon.com or Netflix.com. The network 145 may comprise wired and/or wireless, local and/or wide area, public and/or private networks including the Internet. The devices 115, 125 and 135 may be connected to the network 140 using wired and/or wireless links.

FIG. 2 is a flowchart of operations that may be performed by a server, such as the SWiM server 115 of FIG. 1. Referring now to FIG. 2, at Block 210, movies are processed to create and/or update a subtitles database that may be queried by users. Detailed operations will be described below. At Block 220, user queries of the subtitles database are processed, as will be described in detail below.

FIG. 3 is a flowchart of operations that may be performed to process movies to create/update a subtitles database, which may correspond to Block 210 of FIG. 2, according to some aspects of the disclosure. More specifically, at Block 310, a movie with subtitles is received. The movie may be received by receiving a physical media, such as a DVD, from a movie provider 135 and/or other source, by receiving electronic media from a movie provider 135 and/or another source via the network 145, from a wireless communication link and/or using other conventional distribution techniques. At Block 320, the subtitle track or subtitle subtrack is extracted from the received movie. Techniques for extracting a subtitle track from a video file are well known to those having skill in the art, and need not be described further herein. As part of the subtitle track extraction, trailers, FBI warnings or other items that are not associated with the movie itself may be discarded. In some embodiments, known software may be executed to extract the subtitle track.

Still referring to FIG. 3, the subtitle track is then converted to text data in an ASCII or other conventional data representation format. In particular, the subtitle track typically includes a series of video frames, each including a subtitle line on a blank screen. Conversion may take place by performing character recognition on the extracted subtitle track, to thereby obtain a digital data representation of the text of the subtitles. The use of character recognition to extract data from an image is well known to those having skill in the art, and need not be described further herein. Off-the-shelf character recognition software may be used to generate the text. It will also be understood by those having skill in the art that some movies may already include a subtitle track in text form, rather than in image form, so that the operations of Blocks 310, 320 and 330 may need not be performed. The movie may be referred to as a program which broadly covers any media.

As is well known to those having skill in the art, a given line of subtitles is associated with a range of frames of the movie during which the line of subtitles is displayed. When generating the subtitle text, at Block 330, an identification of the frames over which the respective subtitle line is displayed may also be stored, for example by storing a starting frame number and an ending frame number. Thus, the subtitle text may be stored along with the timing thereof. Other techniques also may be used, such as storing other data about the media. For example, the scenery, the motion, background music, and so forth may be stored as associated with a particular portion of the subtitle.

At Block 340, a single frame or a small subset of frames that is associated with each subtitle line is then grabbed or captured. More specifically, a given subtitle line may be associated with a large number (for example, several hundred to several thousand) of frames. A single frame or a small subset of the frames (for example, fewer than 10 frames) may be grabbed, to provide a visual indication of the scene in which the subtitle line is spoken. It will be understood that a single frame or a small subset of the frames is obtained to provide a visual reference, but not to substitute for a viewing of the movie itself.

Many techniques may be used to determine which frame or small subset of frames should be grabbed for each subtitle line. For example, in some embodiments, the first and/or last frame associated with a subtitle line may be selected. In other embodiments, a frame that is midway between the first and last frame for a subtitle line may be selected. In yet other embodiments, a frame that is between the first and last subtitle frame, and which has a reduced or minimal amount of blurring, may be selected. In still other embodiments, a frame or frames that is clearest may be selected, to aid in visibility. Combinations of these and other techniques may be used to select a frame or a small subset of frames to be grabbed at Block 340. Selection may be manual, automatic or a combination thereof.

Then, at Block 350, the subtitle text, the frame index and the selected video frame(s) may be stored in a searchable format. Storing may use a relational database, such as SQL and/or Oracle, and/or may use a flat file that is word searchable. In some embodiments, the Internet movie database ID (a seven-digit number starting with 0) may be used as a primary key for the database. It will also be understood that the video frames may be stored as part of the database or flat file, or pointers may be used to access the video frames. The storing of subtitle text, indices, pointers and/or images using relational databases and/or flat files is well known to those having skill in the art, and need not be described further herein.

At Block 360, metadata may be added to the stored subtitle text. This metadata may include a movie title, a year of release, a plot outline, a plot summary, a listing of cast members, a listing of genre, an MPAA rating, data about an associated frame or frames for a subtitle or portion of a subtitle and/or other related metadata about the movie. This metadata may be generated independently, may be obtained from other movie databases and/or may point to other databases.

Additional metadata may also be generated by users or workers parsing or annotating the movie, such as users 125 of FIG. 1B, based on a user's particular interest. Thus, for example, a user may add metadata that identifies, for example, the smoking of a cigarette in the movie at a point corresponding to a given subtitle line. This "smoking" metadata may be stored in the database for later querying. In another example, metadata identifying the use of a gun may also be stored in the database and associated with a given subtitle line. This user-generated metadata may be incorporated into the overall text database and/or may be used by an individual user 125 or a group of users 125 to create customized metadata that is associated with the subtitle lines of movies. A community approach could be employed where individual users may provide such data while watching a movie, via a remote control and dialog or via a computer or other means that data may be about individual perceptions on a scene-by-scene basis such that a community buildup interest or perception for particular portions may be captured. Thus, in a search phase, one could ask for scenes that have an approval rating over 90%, scenes that are in an average the top ten scenes of viewers, or other scene parameter and threshold.

Referring now to Block 370, in some embodiments, the text file is processed to obtain statistics regarding the movie. Numerous embodiments of statistics may be generated according to various embodiments of the present invention, as will now be described. For example, the "total number of lines" may be obtained by adding the total number of lines of subtitles in a given movie. The "total number of lines per minute" may be obtained by dividing the total number of lines of subtitles by the length of the movie in minutes. The "number of words per minute" may be obtained by dividing the total number of words in the subtitles by the number of minutes of the movie. Lines/minute and words/minute may provide an indication of how "talky" a movie is. "Unique words per minute" may also be calculated by building a database of unique words in a given movie from the text file and dividing by the number of minutes. Unique words per minute may provide an indication of vocabulary size and/or repetitiveness for a movie.

Other unique statistical indices may be generated according to various embodiments of the present invention. For example, a "swearosity" index may be generated by identifying all occurrences of "swear words" that correspond to a predefined list of swear words. The swear words may be filtered for context to ensure that a swear word is actually being used. A swearosity index may then be determined by dividing the number of swear words by the number of minutes of length of the movie, to obtain a "number of swear words per minute" index. The swearosity index can provide an indication of the density of swear words in a movie.

In other embodiments of the invention, an "inarticulosity" index may be generated by identifying the number of inarticulate utterances, such as "grrr" or "hmmm", inarticulate expressions, such as "Uh-huh", and/or other elements of the subtitle text that do not correspond to words. Inarticulate utterances may be identified by comparing the subtitle text to a predefined list of inarticulate utterances. Alternatively, the subtitle text may be compared to a dictionary for a given language, to obtain a number of inarticulates. The number of inarticulates may then be divided by the length of the film in minutes to obtain an inarticulosity index.

Still other unique statistical indexes may be provided according to other embodiments of the present invention by analyzing the subtitle text file and obtaining statistics that may be of interest to movie lovers. For example, a "proper names" index may measure the number of different characters in a movie. A "places" index may measure the number of unique places referred to in the movie. Other indexes may be provided. Any statistics may be used to filter or alter the presented data. For example, only shows with a swearosity below a certain level for children. Other words such as sexually explicit words may also be analyzed such that movies below a certain threshold may only be shown according to a parameter.

Even more sophisticated indices may be provided by comparing subtitle texts of different films to one another. For example, a "new word" index may be computed by comparing all of the words used in a given movie to all of the words used in movies that were released in previous years, to determine which words were first used in a given movie. Other more sophisticated indices that compare the subtitles of a given movie to subtitles of other movies may also be provided according to other embodiments of the present invention.

Finally, referring to Block 380, operations of Blocks 310-370 continue to be performed for additional movies, in order to provide a corpus of movies that can be authoritative. For example, the IMDb database presently includes over 300,000 entries. However, there may be only 10,000-20,000 movies that are viewed as "important" in terms of interest and analysis by movie lovers or these may be only 5,000 segments within the 20,000 movies that were rated as over 90% approval by viewers. In some embodiments, an excellent corpus of 5,000 movies may be provided, given the correct 5,000 movies. Target lists for a correct corpus may be obtained using lists of Oscar winners, "best of" lists, "top 1,000" lists, etc. Accordingly, the corpus of the text file need not be unreasonably large to provide a meaningful database for analysis.

A summary of the operations of FIG. 3, according to some embodiments of the present invention, will now be provided. In particular, given a DVD, it may take ten minutes or less to extract the desired content (Block 320). Automated CPU-intensive work may then be performed in order to provide the subtitle track in a form which is usable for subsequent processing. In some embodiments, subtitles may be reconstructed via Optical Character Recognition (OCR) from substreams extracted from MPEG-2 vob files (Block 330). Moreover, subtitles in srt format may be used to build data files of dialog and timings, and frames are dumped from the movie, one for each subtitle (Block 340). Each file then has the frames that were grabbed, plus the dialog (subtitles), plus the metadata, stored in a directory that may be sent to a staging server (Blocks 350 and 360). Then, when a new global index is recomputed, the new movie is just picked up with the remaining movies (Block 380). Index addition or deletion is also possible in some embodiments of the present invention.

Figure 4:
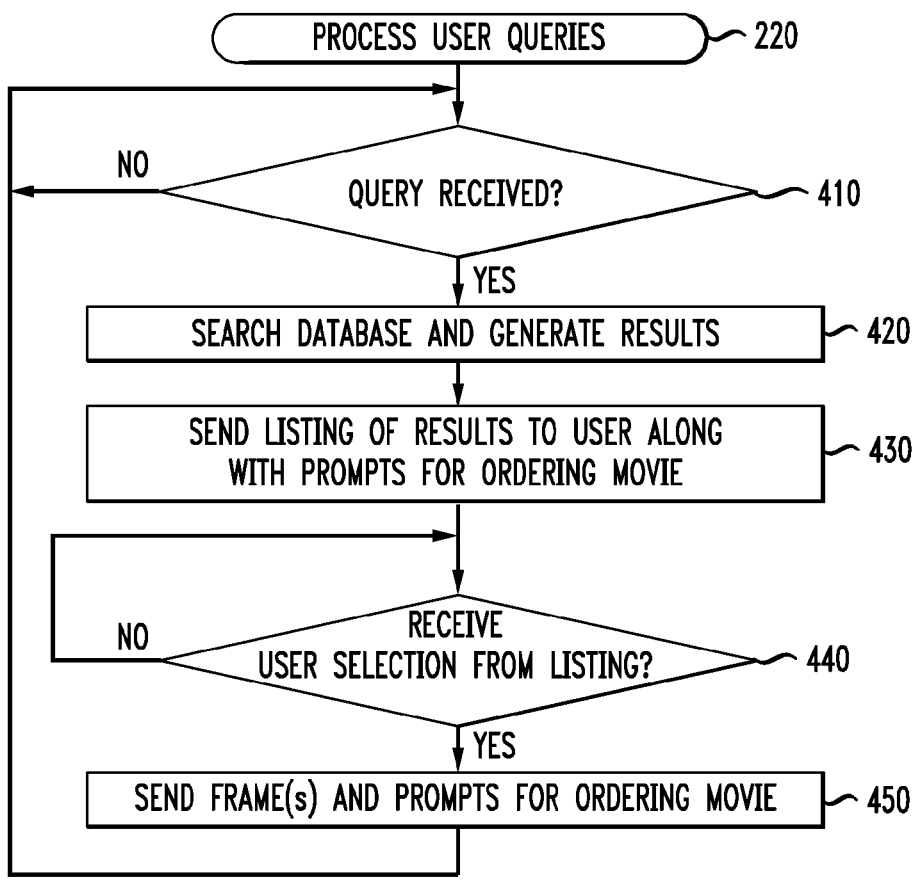
FIG. 4 illustrates yet another method embodiment.

FIG. 4 is a flowchart of operations that may be performed to process user queries of the subtitles according to various embodiments, which may correspond to Block 220 of FIG. 2. It will be understood by those having skill in the art that the subtitles database may include the subtitle text files, the corresponding video frame(s) and/or pointer(s) thereto, additional metadata and statistics that were generated as described in connection with FIG. 3. These items or subsets thereof may be stored in what is referred to herein as a "database". However, as already described, the actual storage mechanism may be flat files, tables, linked lists, relational databases and/or non-relational databases. User interface screenshots of FIGS. 5A-5H will also be used to illustrate processing of user queries according to some embodiments of the present invention.

Figure 5A:
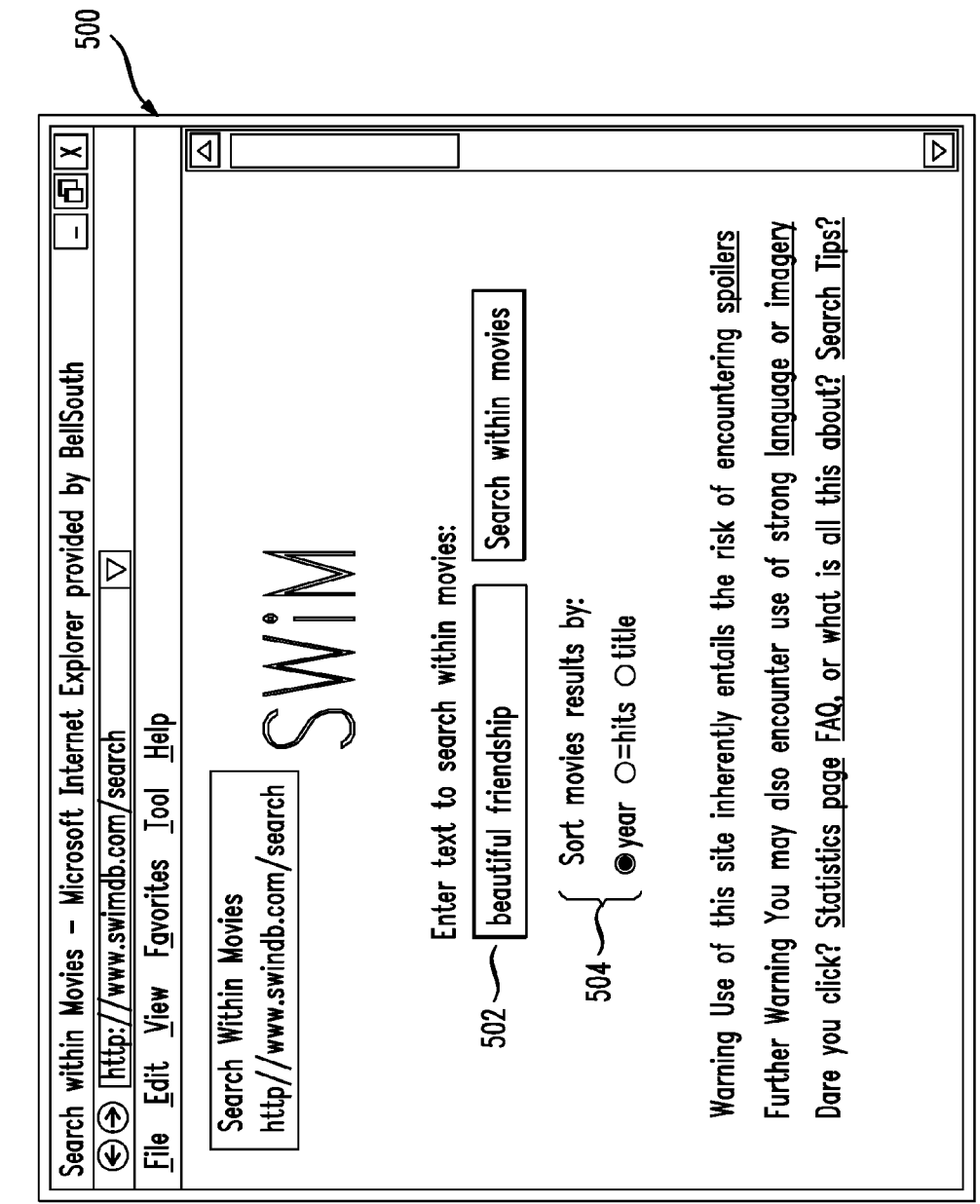
FIG. 5A illustrates an example search user interface.

Referring now to FIG. 4, at Block 410, a query is received, for example, from a user device 125 of FIG. 1B. The user interface 500 of FIG. 5A may be displayed. As shown in FIG. 5A, text to be searched may be entered in a search field 502. In FIG. 5A, "beautiful friendship" is being searched. The results may be sorted 504, as shown in FIG. 5A, by year, number of hits or movie title. Other parameters may be used to sort the results such as by user ratings and so forth.

Referring again to FIG. 4, at Block 420, in response to receiving the query at the server 115, a search of the database is performed and the results are generated. If the database is a relational database, a search may be performed using conventional relational database querying techniques. In other embodiments, if the database is a flat file, a multi-word search may be performed by first searching for the longest word and obtaining all subtitle lines that have this longest word. For each remaining word, the subtitle lines that were retrieved are then searched for each remaining word in reverse order of length. Accordingly, only a single index dip into a flat file may be needed for the multiple word query in some embodiments.

Analogous techniques may be used for a "phrase match" search, or for an approximation or "wild card" search. For example, some embodiments of the present invention may allow for searching words using an "AND" operator, to find subtitle lines that contain all of the listed words. In other embodiments, the use of double quotes ("") or other delimiters may be used to find an exact match. Accommodations may be made for unfamiliar spellings and/or differences between, for example, British and American English. Accounting for translation errors may also be provided for, as well as accounting for slang and other non-words. Other searching techniques will be known by those having skill in the art and need not be described further herein. In some embodiments, the search results may be cached so that searches that are repeatedly performed, such as "I am your father", may be cached separately to provide quicker searches and conserve resources. In other embodiments, various combinations of subtitle text, metadata and statistics may be searched, using search techniques well known to those having skill in the art.

Referring back to FIG. 4, at Block 430, the listing of results is sent to the user device 125 along with prompts for ordering the various movies. The ordering prompts may include a range of audible, text and/or icon prompts, such as messages, buttons and/or pop-up windows known in electronic commerce and/or links to other websites where movies can be ordered. One or more frames may also be presented to the user at this time to encourage the ordering of a movie or media presentation.

Figure 5B:
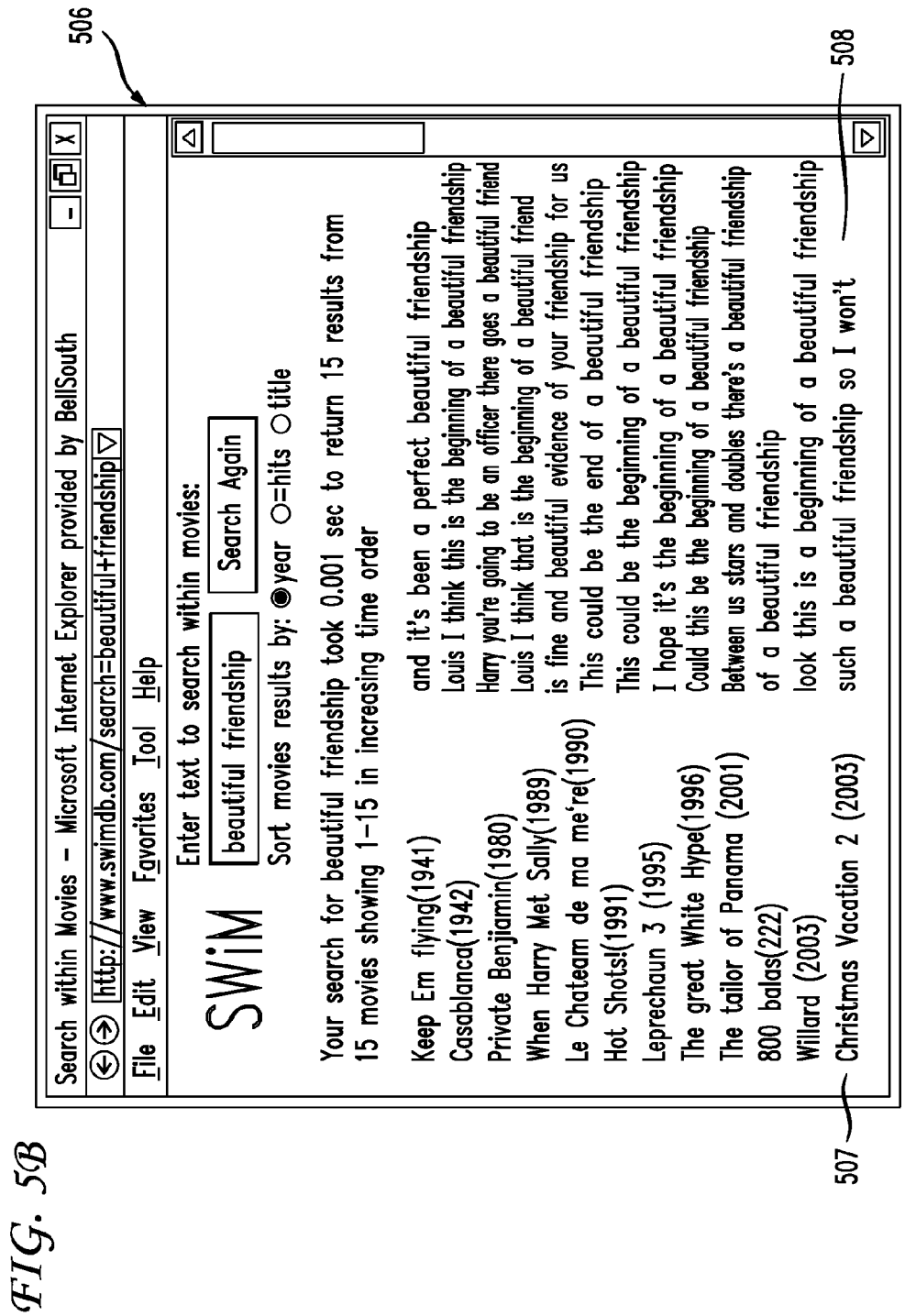
FIG. 5B illustrates an example result of a user search.

For example, FIG. 5B illustrates the listing 506 of results of the search "beautiful friendship" from FIG. 5A. As shown in FIG. 5B, the screen 506 shows the search criteria "beautiful friendship" and indicates how the movie results were searched. The search results are shown in the form of a list or table. However, other formats will be described below. In the list of FIG. 5B, a given movie is shown in a given row 507 with the title and date of the movie shown in the left (first) column, and the actual subtitle line shown in the right (second) column 508. In some embodiments, a subtitle line before and/or after the given subtitle line may also be shown for readability, and subtitle lines may be demarcated by "//". In some embodiments, clicking on the movie title and/or on the subtitle line may initiate ordering a copy of the movie for purchase or rental.

Referring again to FIG. 4, at Block 440, a user selection may be received from the listing. For example, a user selection from the right column of FIG. 5B may be received as a result of a user clicking on one of the subtitles in the right column. In response, in some embodiments, at Block 450, the frame(s) and prompts for ordering the movie are sent to the user device.

Figure 5C:
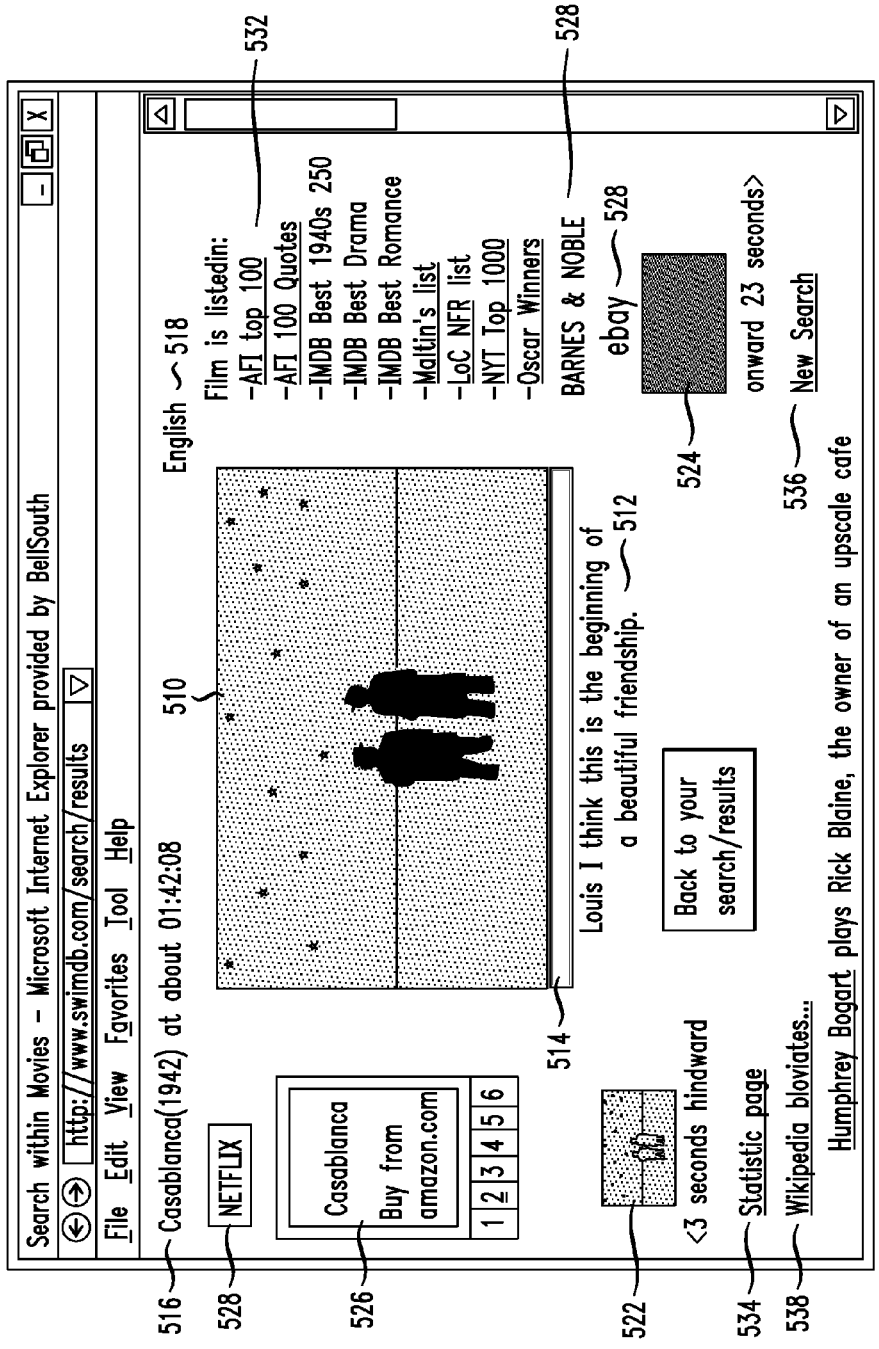
FIG. 5C illustrates an example resulting text from a user search as well as an associated frame.

FIG. 5C illustrates an example of a screen that may be displayed when the user clicks on the right column of the second row, corresponding to "Louis, I think this is the beginning of a beautiful friendship", from the movie "Casablanca". As shown in FIG. 5C, the frame that is associated with the quote is shown at 510, and the subtitle line is shown at 512. At 514, a graphical bar or dashboard indicates an approximate location in the movie where the subtitle quote occurs. Thus, the quote "Louis, I think this is the beginning of a beautiful friendship" occurs near the end of the movie "Casablanca", as shown at 514.

Other, more sophisticated graphical bars 514 may be provided according to other embodiments of the present invention. For example, "swearosity" over time may be graphically indicated using a dashboard 514. This swearosity versus time indicator may be used to filter swear words or associated scenes. In other embodiments, the number of words per minute may be graphically indicated by a dashboard 514. In still other embodiments, various other statistical tools may be displayed in graphical/dashboard format as a function of time, and clicking on a given point in the dashboard can display the appropriate subtitle line and frame.

Continuing with the description of FIG. 5C, the upper left corner indicates the title of the movie and the time at which the subtitle line is spoken (01:42:08) at 516. The language of the subtitles may be indicated in the upper right at 518. When multiple language subtitles are included, multiple language links may be displayed at 518, and selected to provide the desired language subtitle at 512.

Other navigation capabilities also may be provided in FIG. 5C. In particular, the previous (immediately preceding or hindward) subtitle line and its associated frame are indicated at 522, and the next (immediately succeeding or onward) subtitle line and its frame are indicated at 524. It will be understood that the previous/next subtitle 522/524 may also provide an indication of how much earlier or how much later the previous/next subtitle block occurs. Thus, FIG. 5C indicates that the previous subtitle block was 3 seconds earlier at 522, and indicates that the next subtitle block is 23 seconds forward at 524. Clicking on either the previous or next subtitle block 522 or 524 will replace this subtitle in the main subtitle block 510.

In some embodiments, steps may be taken to reduce or prevent the use of systems to navigate the entire movie and act as a substitute for purchasing or renting the movie itself. Thus, for example, the frames that are captured at 510, 522 and 524 may be low resolution. Moreover, as more sequential frames are accessed using the previous/next frame buttons 522/524, the frames may become increasingly lower resolution and/or increasing lower contrast, have fading audio presented, and so forth.

Figure 5D:
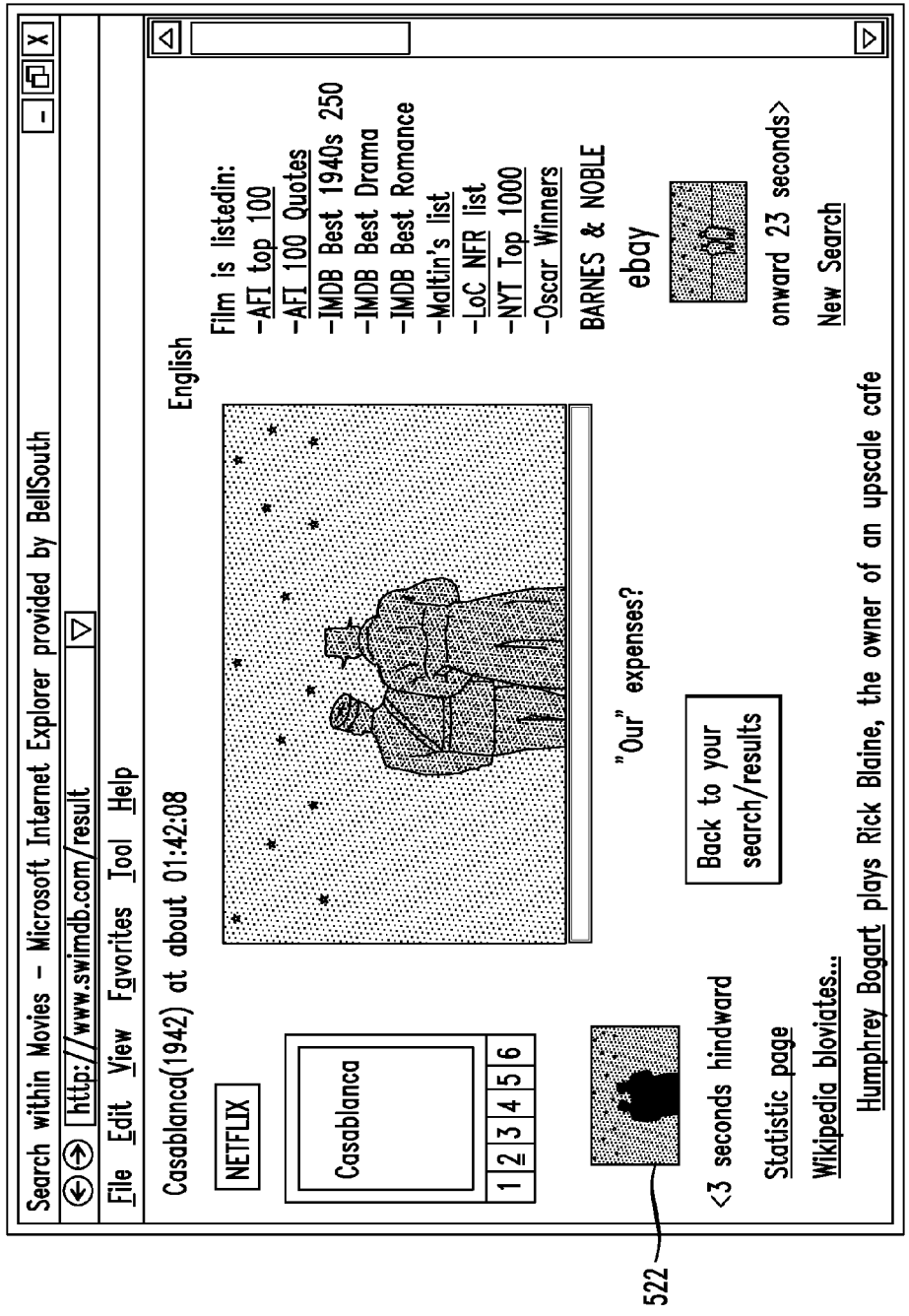
FIG. 5D illustrates another user interface associated with viewing a frame in response to a user query.
Figure 5E:
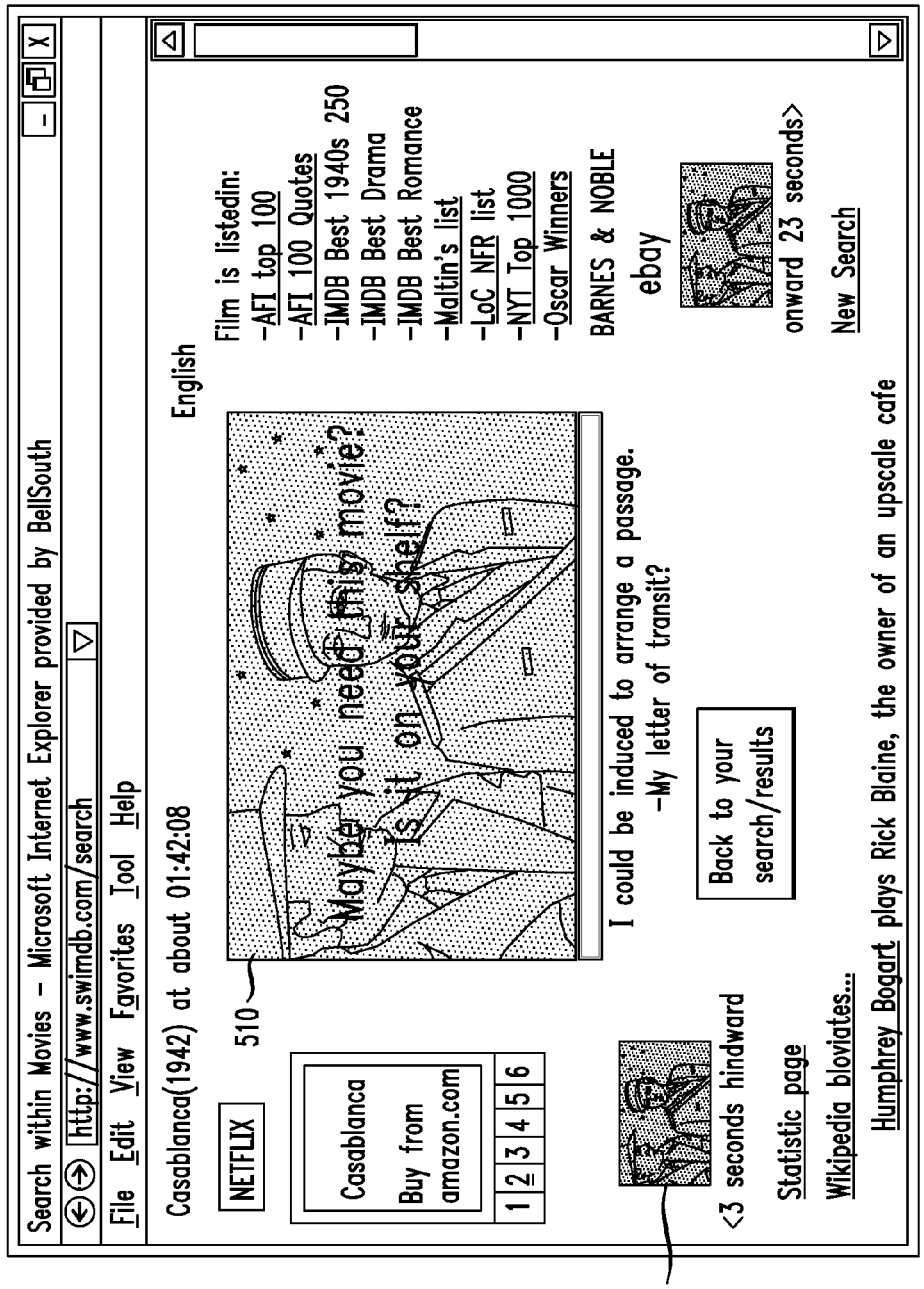
FIG. 5E illustrates an example interaction which prompts a user to purchase a media presentation.
Figure 5G:
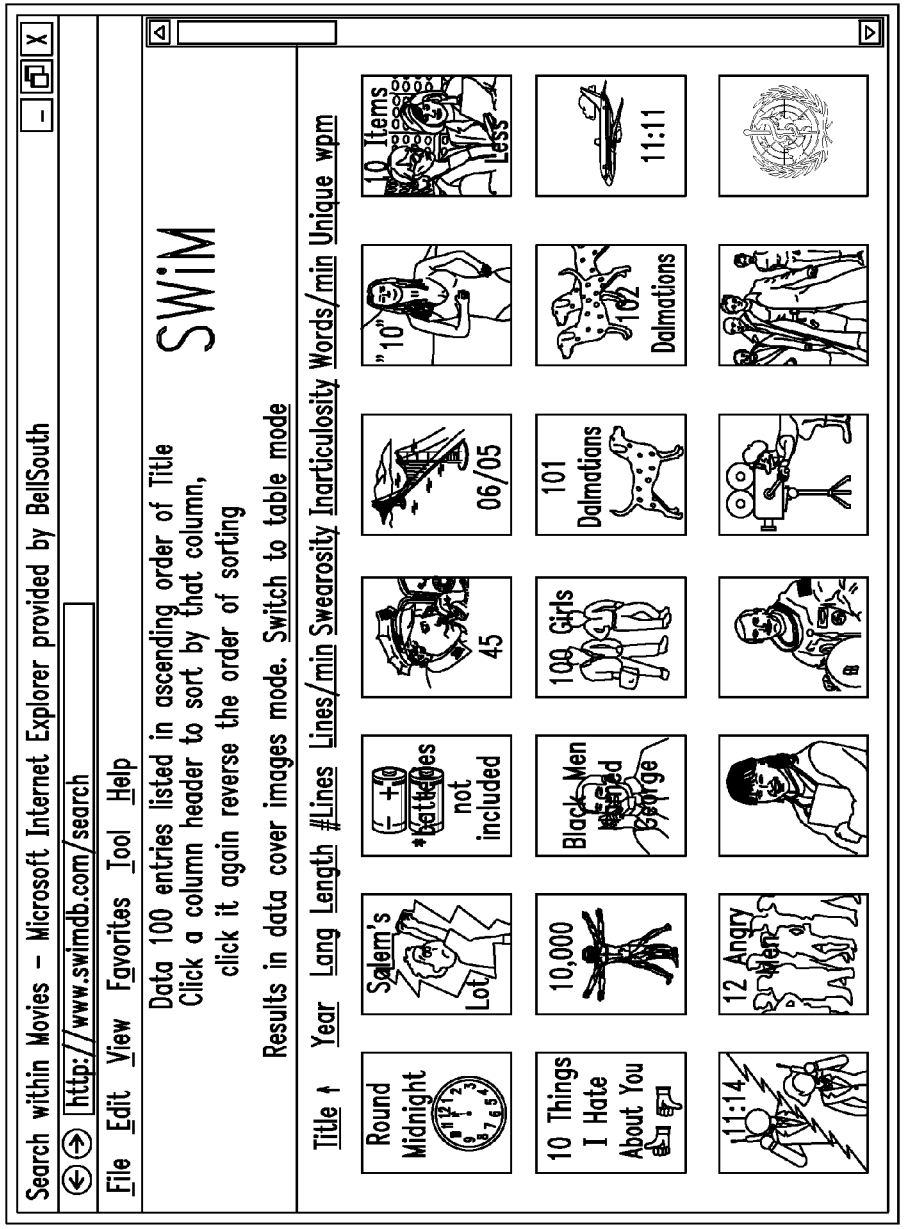
FIG. 5G illustrates an example interface in which movie covers are illustrated to the user.

FIG. 5D illustrates the screen that may be displayed by clicking at 522 to obtain the immediately previous frame. FIG. 5E illustrates the screen that may be displayed by again clicking on the immediately previous frame at 522. As shown in FIG. 5E, the contrast has been decreased and a message is also superimposed on the frame stating "Maybe you need this movie? Is it on your shelf?". Accordingly, it may be unsatisfactory, from a user perspective, to navigate through the set of frames that were grabbed, instead of purchasing/renting the movie, thus providing a form of Digital Rights Management (DRM). In other embodiments, other techniques may be used to prevent or make difficult, the grabbing of the frame displayed at 510 and using the frame, for example, as a screen saver or wallpaper.

Referring again to FIG. 5C, other metadata may be accessed from the screen of FIG. 5C. For example, links 532 indicate other listings that may be linked to, which may include the given movie. A Wikipedia bloviate 538 for the given film also may be linked to, if present.

Finally, some embodiments of the present invention may provide one or more links to movie providers for purchasing or renting the movie. Thus, for example, FIG. 5C illustrates a link 526 to amazon.com and other links 528 to itunes, Netflix.com, ebay.com and Barnes&Noble.com. According to other embodiments of the present invention, when multiple editions of the film are available, multiple links to a given movie provider may be provided, for example, by allowing the user to mouse over the various selections 1, 2, 3, 4, 5, 6 that are associated with the amazon.com link 526. The links may be sized and/or positioned to provide sponsored link opportunities using techniques known to those having skill in the art.

FIG. 5C also illustrates a link to a statistics page 534. In some embodiments, the statistics page may only include the movies that are contained in the list or table corresponding to the user query, which was illustrated in FIG. 5B. Alternatively, in other embodiments, the statistics page may be for the entire corpus of movies contained in the database. Another aspect may involve statistics, user ratings, metadata, or any other parameter associated not with the movie generally but with the particular frame or set of frames associated with the matched quote 512. Thus, if the scene was rated at a 60% approval rating by viewers or other data about that scene that can be gathered may be provided via a link. User comments, blogs, Wikipedia type articles may also develop around certain scenes which may be linked to form an interface such as those shown. FIG. 5F illustrates the first few entries for all of the movies in the database, sorted in ascending order of titles. Statistics are provided for year, language, length, number of lines, lines per minute, swearosity, inarticulosity, words per minute, and unique words per minute. Other statistics may be utilized as well. Clicking on any one of the column headers will resort the list by that column. Clicking again on the column header will sort in the reverse order (ascending/descending) from that which is shown. The various statistical indexes shown in FIG. 5F were already described above in connection with Block 370 of FIG. 3, and will not be described again in the interest of brevity. Clicking on an individual title (first column of FIG. 5F) can link to one or more movie provider sites for purchasing/renting the movie.

Figure 5H:
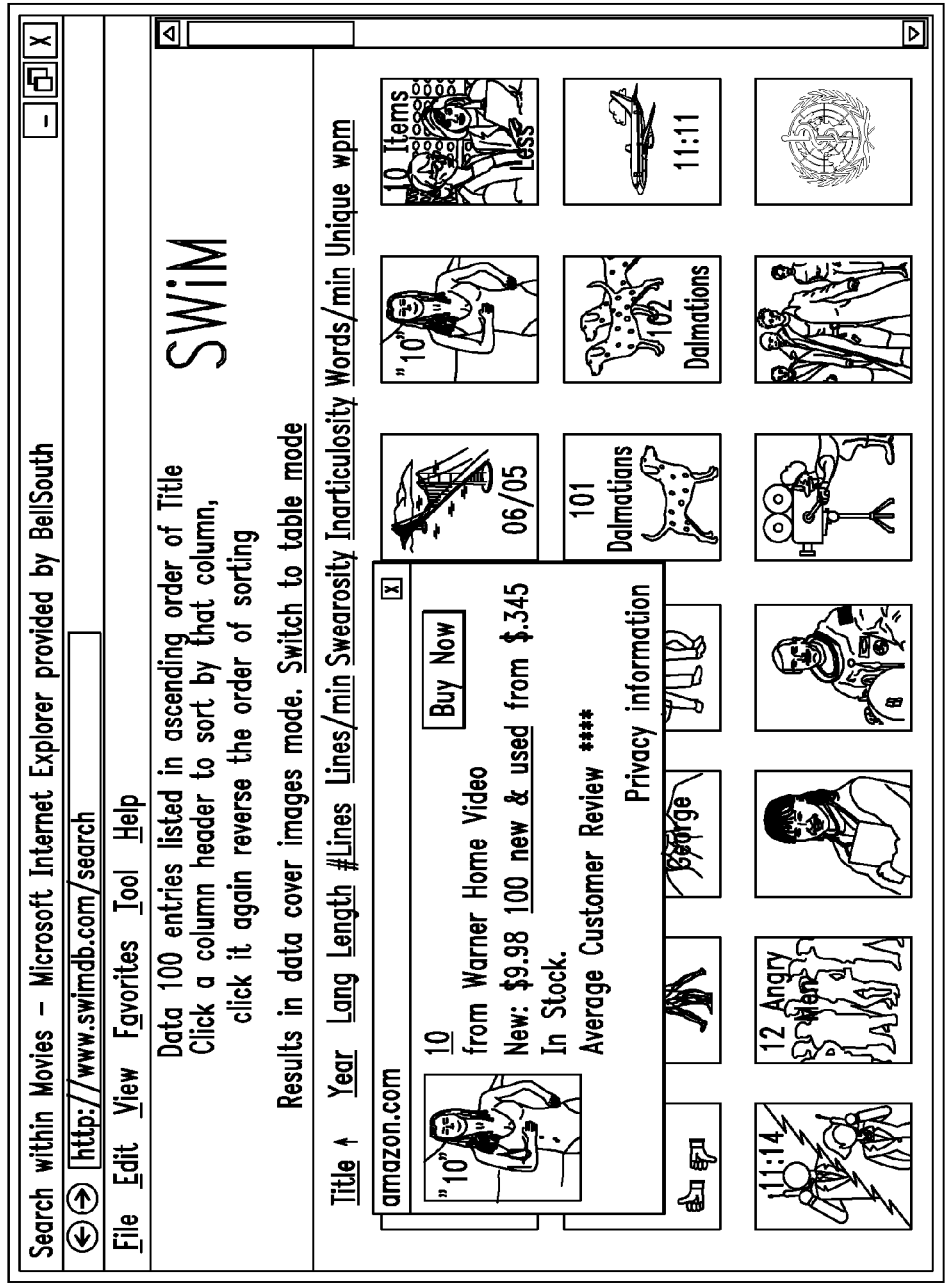
FIG. 5H illustrates an example by now option for the user.

The statistics page of FIG. 5F is shown in table form, as were the query results of FIG. 5B. However, other embodiments of the present invention can provide a listing using a "cover image" mode. For example, clicking on the "Switch to cover image mode" 550 of FIG. 5F displays the screen of FIG. 5G, which provides cover images of all of the listed movies of FIG. 5F. The cover images may be obtained using well known techniques. Moreover, clicking on any one of the cover images can provide a link to a movie provider for buying or renting the movie, as illustrated in FIG. 5H. Cover image mode may also be used in connection with any other statistical ordering. For example, a display of the cover images of movies sorted in ascending order of swearosity, inarticulosity and/or combinations thereof may be provided.

Figure 6:
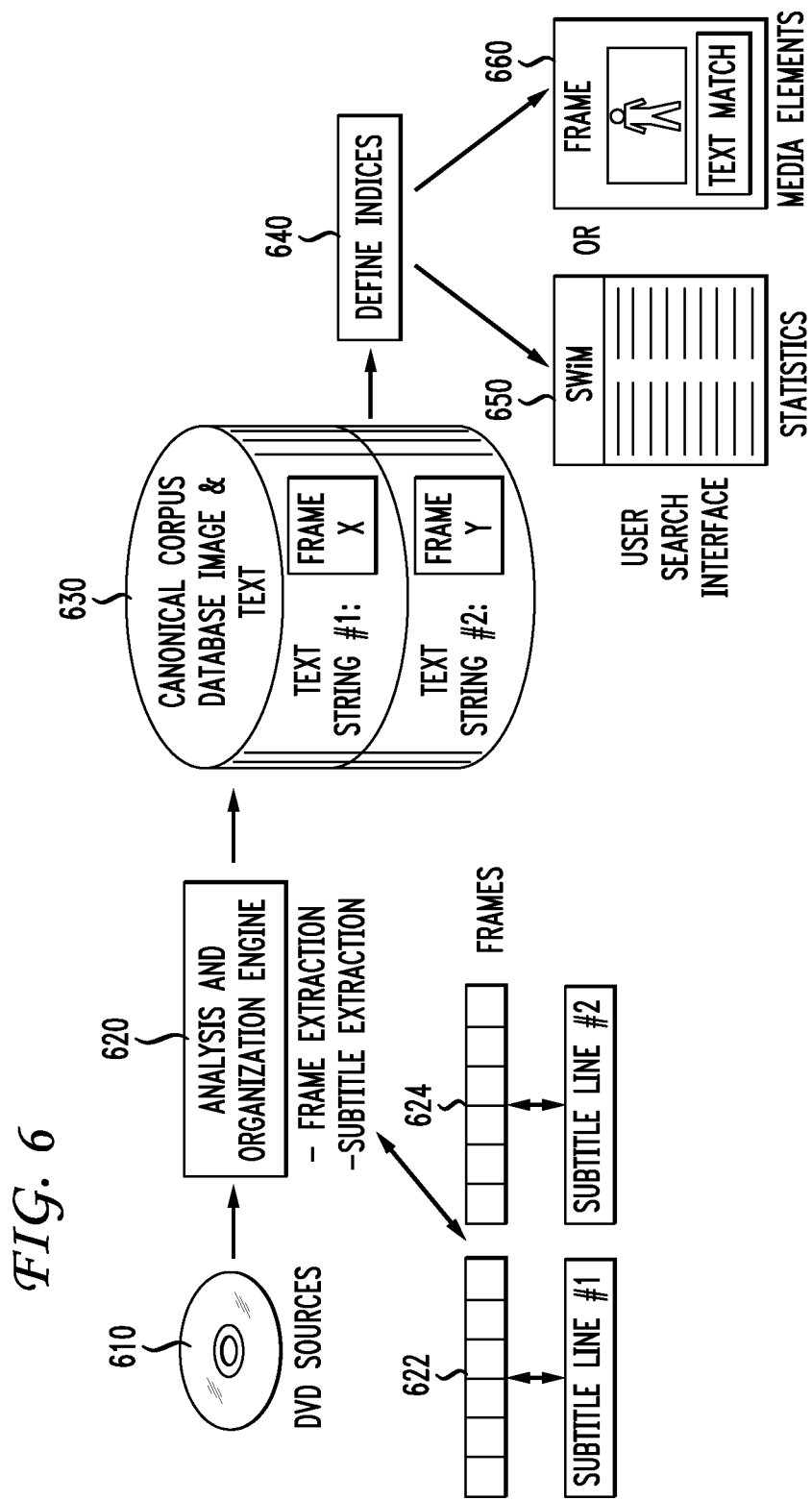
FIG. 6 illustrates the general process associated with preparing a database of searchable media.

FIG. 6 is a functional block diagram of systems, methods and/or computer program products according to other embodiments disclosed herein. In FIG. 6, DVDs 610 are assumed to be the movie sources for use by an analysis and organization engine 620, which may be contained in SWiM server 115 of FIG. 1B. The analysis and organization engine 620 performs frame extraction and subtitle extraction, as was described in detail at Blocks 340 and 320, respectively, of FIG. 3, and as was illustrated conceptually at 622 and 624 of FIG. 6. The analysis and organization engine 620 generates a canonical corpus 630, i.e., an authoritative database of a critical mass of movies. The database includes images and text, as illustrated at 630. At Block 640, indices are defined, as was also described at Block 370 of FIG. 3. User interfaces may be provided using statistics, as shown at Block 650 and as was illustrated, for example, in FIG. 5F, or using media elements, as shown at Block 660 and as was illustrated, for example, in FIG. 5C.

It will also be understood by those having skill in the art that embodiments of the present invention have been described above in connection with subtitles because of their universal applicability and relative ease of extraction from a DVD. However, other embodiments of the present invention may use closed captioning instead of, or in addition to, subtitles, to generate the text files described above. Closed captioning may be more difficult to extract from a movie, because closed captioning may be embedded in a video file. Nonetheless, once extracted, closed captioning may be used as a basis for building a canonical corpus for movies according to any of the above-described embodiments.

Additional discussion of various embodiments of the present invention will now be provided. In particular, some embodiments of the present invention can allow media to be indexed in better ways, including the actual content of the media, and not just metadata about the media. For example, searching metadata about books at amazon.com, and searching of short samples of music at amazon.com and itunes.com may be done. Videos can also be searched using metadata at alltheweb.com and google.com. Lyrics and popular music also may be searched in various places. Finally, metadata about movies may be searched in the IMDb database.

In sharp contrast, however, embodiments allow the actual content of movies to be searched, rather than just information about movies (metadata). Stated differently, a benefit of the disclosure allow users to index, study, compare or otherwise ruminate about the actual content of movies, for use in discussion, refutation, clarification, extension, etc. Embodiments disclosed herein may also lead to increased interest in various areas of movie making, and may lead to increased sales in some of the finer, but somewhat forgotten, moments in cinema history.

Embodiments disclosed herein may not offer a movie experience but, rather, may create indexing to the content of the subtitles of movies and may provide links to other related content or links to purchasing and/or renting movies of interest. Thus, embodiments of the invention can offer a relatively unambiguous method of indexing, searching and referring to movies, which may, in turn, support higher level analysis, but does not support watching the movie. Support may be provided, however, for ordering a copy of the movie for purchase and/or rental.

Other embodiments disclosed herein may store subtitle lines in multiple languages, and allow searching in a given language or across languages. Non-coincident subtitle lines may be accounted for. In particular, some embodiments of the present invention may allow searching of a given word in a given language, and, if multiple language subtitles are available, to find the corresponding subtitles in one or more other languages. Flipping between the various language subtitles may provide a user with a translation of the subtitle line of the film, while associating the subtitle line with a given frame. Moreover, a listing may also indicate the original language of the film, so that a user can see, for example, when a given French word is being used in an English language film, or when a given French word is being used in a French language film.

Many of the above described embodiments included a single general purpose database. However, databases may also be created that are specific to a given subset of users according to other embodiments of the invention. Thus, in one trivial example, some users may be particularly fond of Marlboro cigarettes, and may submit metadata for films that include Marlboro cigarettes, along with links to the appropriate subtitle lines thereof. This specialized metadata database may then be available to a smaller user group for restricted access and/or at a higher fee, in some embodiments of the present invention. Other embodiments may allow users to add comments to the database, which comments may then be searchable along with the subtitle lines, metadata and/or statistics to define users who have common interests. Accordingly, although some embodiments of the present invention provide a canonical corpus for movies, other embodiments allow varying degrees of personalization by user group, interest and/or other criteria, which personalization may be accessed based on a tiered feature model and/or restricted access model.

Embodiments disclosed herein may also provide digital rights management features so as to reduce or eliminate the possibility of using embodiments of the present invention as a substitute for purchasing or renting the movie. Digital rights management techniques described above can include using cover art and single frames only, providing copy protection of the frames, showing a surrogate image instead of a frame, providing graying or other contrast reduction on repeated use, providing automatic links to sources of rental or purchase, providing prompting messages and/or restricting non-permitted uses, such as screen savers. Although embodiments may allow full text searching of the subtitle lines of a given movie, a very limited number of frames themselves may be accessible. For example, in some embodiments, far less than 0.01% of all the frames in the movie are viewable.

Some embodiments disclosed herein may provide searching of the subtitle database using the text, metadata and/or statistical data that were described above. However, other embodiments may provide linking to other external databases and/or descriptive information, or audio segments associated with the retrieved video segments, as well as searching using the combined externally available information and internally available subtitle text in the database. In one example, combined searching of the Wikipedia database and the SWiM server database may be provided to generate a mashup type response.

From a marketing standpoint, graduated features may be provided in some embodiments of the present invention. A free entry level tier may be provided in some embodiments, along with a pay-by-the-search model and/or a premium features tier. Moreover, embodiments of the invention need not be limited to movies, but may be also used for television shows that include a subtitle and/or closed caption content. Annotated content may be provided in standardized formats by the MPEG-7 description framework, and a potentially open API may be provided by the GPL code. Music lyrics may also be indexed along with other symbologies, such as music notation. The media also need not be limited to DVDs, but may include other media, such as Blue Ray. In fact, since Blue Ray and other enhanced media allow inclusion of an executable program, some embodiments of the present invention may be included as a standalone program that may be coupled to the media itself. Embodiments of the present invention may also be coupled to 3D content that is provided on a disc, in addition to the 2D content of the movie. For example, a 3D version of a movie may be provided on a DVD with alternative viewing angles that may be accessed by embodiments of the present invention.

Finally, some embodiments may be personalized in other ways, for example, to take into account a given user's library of movies, rather than all movies. Accordingly, a user may input a list of titles that the user owns, or the system may identify a user's library of movies as an itunes library, and then all searches may be based on these titles. In other embodiments, searches may be performed on movies that the user does not own. Combinations of "My Collection" and "All Movies" may be searched, as well.

Some embodiments may, therefore, provide analysis features for movies that may have heretofore been unavailable. A key word or a phrase in movie dialog may be searched for by searching the actual dialog. Users can assess the usage of a key word over time, across movies, across genres of movies and/or across other categories. Movies may be tabulated on the basis of words, such as which movie the word "dude" was used the most. Movies may also be assessed on higher level linguistic devices, such as swearosity, first use of a given word, inarticulosity, etc. Search set selection tools may also be offered based on the dialog. For example, a search can find all movies that are rated NC-17, but exclude those that use a given swear word. "Frame+text" interfaces may be provided that allow users to recognize the movie moment they are looking for. Many different embodiments of dashboards may be provided, to show at a glance the dialog structure locally and/or globally. The purchase or rental of movies may be incented by providing a pleasant, flexible and compelling exploration interface with multiple paths to purchase or fulfillment. Copyright compliance and/or digital rights management features may also be provided, while still providing a customer-friendly user interface. Moreover, embodiments disclosed herein can provide a reference infrastructure for users to refer to movie elements. For example, a user can send a link to a moment in a database according to embodiments of the present invention, to make a point in a discussion. User tagging and tag streams may also be provided, in addition to dialog streams, to enhance personalization.

Embodiments within the scope disclosed may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method for processing a video presentation comprising:
    extracting a subtitle track from the video presentation, to yield an extracted subtitle track, wherein the extracted subtitle track is a textual representation of at least one dialog within the video presentation;
    retrieving a representative frame from a plurality of frames associated with the extracted subtitle track, wherein the representative frame is retrieved based on predetermined criteria;
    adding metadata to the extracted subtitle track, wherein the metadata differs from the extracted subtitle track, and wherein the metadata is obtained from a restricted access database, to yield program data;
    processing the program data comprises the extracted subtitle track and the added metadata, via a processor, to:
        identify, within the program data, instances of words and phrases falling within a same concept category,
        obtain program statistics for comprising at least a number of occurrences of each of the words and phrases falling within the same concept category, and
        derive a statistical index for each of the words and phrases based on the program statistics; and
    storing the program data, the program statistics, the statistical index, and the representative frame in a relational media database differs from the restricted access database.

2. The method of claim 1, wherein the metadata identifies particular features of the representative frame.

3. The method of claim 1, wherein the metadata is defined manually by a user.

4. The method of claim 1, wherein the metadata is generated by receiving and storing viewer comments on a scene-by-scene basis as a respective viewer watches the video presentation.

5. The method of claim 1, wherein the metadata comprises a viewer rating on a scene-by-scene basis for the video presentation.

6. The method of claim 1, further comprising:
    receiving a user query associated with the at least one dialog in the video presentation;
    searching the relational media database for video presentations corresponding to the user query and presenting a list of results;
    receiving a user selection of a video presentation from the list of results; and
    transmitting the representative frame, a portion of a subtitle track associated with the selected video presentation, and a prompt for ordering the selected video presentation.

7. The method of claim 6, further comprising presenting options for selecting a second metadata associated with the representative frame.

8. The method of claim 6, further comprising presenting individual statistics for each video presentation in the list of results.

9. The method of claim 6, wherein the list of results comprises a user approval rating for respective scenes associated with the list of results.

10. The method of claim 1, further comprising:
receiving a user query based on a dialog in a plurality of video presentations comprising the video presentation, wherein the plurality of video presentations is identified as a user's personal library; and
presenting, as a result of searching the plurality of video presentations, a list of video presentations comprising the program statistics.

11. A computer-readable storage device having instructions stored which, when executed by a computing device, cause the computing device to perform operations of processing a video presentation, comprising:
extracting a subtitle track from the video presentation, to yield an extracted subtitle track, wherein the extracted subtitle track is a textual representation of at least one dialog within the video presentation;
retrieving a representative frame from a plurality of frames associated with the extracted subtitle track, wherein the representative frame is retrieved based on predetermined criteria;
adding metadata to the extracted subtitle track, wherein the metadata differs from the extracted subtitle track, and wherein the metadata is obtained from a restricted access database, to yield program data;
processing the program data comprises the extracted subtitle track and the added metadata, via a processor, to:
identify, within the program data, instances of words and phrases falling within a same concept category,
obtain program statistics for comprising at least a number of occurrences of each of the words and phrases falling within the same concept category, and
derive a statistical index for each of the words and phrases based on the program statistics; and
storing the program data, the program statistics, the statistical index, and the representative frame in a relational media database differs from the restricted access database.

12. The computer-readable storage device of claim 11, wherein the metadata identifies particular features of the representative frame.

13. The computer-readable storage device of claim 11, wherein the metadata is defined manually by users.

14. The computer-readable medium storage device of claim 11, wherein the metadata is generated by receiving and storing viewer comments on a scene-by-scene basis as a viewer watches the program video presentation.

15. The computer-readable storage device of claim 11, wherein the metadata comprises a viewer rating on a scene-by-scene basis for the video presentation.

16. The computer-readable storage device of claim 11, having additional instructions stored which result in the operations further comprising:
receiving a user query associated with the at least one dialog in the video presentation;
searching the relational media database for video presentations corresponding to the user query and presenting a list of results;
receiving a user selection of a video presentation from the list of results; and
transmitting the representative frame, a portion of a subtitle track associated with the selected video presentation, and a prompt for ordering the selected video presentation.

17. The computer-readable device of claim 16, having additional instructions stored which result in the operations further comprising presenting options for selecting a second metadata associated with the representative frame.

18. The computer-readable storage device of claim 16, having additional instructions stored which result in the operations further comprising presenting individual video presentation statistics for each video presentation in the list of results.

19. A computing system for processing a video presentation comprising:
a processor;
a computer-readable storage device having instructions stored which, when executed by the processor, cause the processor to perform operations comprising:
extracting a subtitle track from the video presentation, to yield an extracted subtitle track, wherein the extracted subtitle track is a textual representation of at least one dialog within the video presentation;
retrieving a representative frame from a plurality of frames associated with the extracted subtitle track, wherein the representative frame is retrieved based on predetermined criteria;
adding metadata to the extracted subtitle track, wherein the metadata differs from the extracted subtitle track, and wherein the metadata is obtained from a restricted access database, to yield program data;
processing the program data comprises the extracted subtitle track and the added metadata, via a processor, to:
identify, within the program data, instances of words and phrases falling within a same concept category,
obtain program statistics for comprising at least a number of occurrences of each of the words and phrases falling within the same concept category, and
derive a statistical index for each of the words and phrases based on the program statistics; and
storing the program data, the program statistics, the statistical index, and the representative frame in a relational media database differs from the restricted access database.

20. The system of claim 19, wherein the metadata identifies particular features of the representative frame.

21. The system of claim 19, wherein the metadata is generated by receiving and storing viewer comments on a scene-by-scene basis as a viewer watches the video presentation.

22. The system of claim 19, the computer-readable storage device having additional instructions stored which result in the operations further comprising:
receiving a user query associated with the at least one dialog in the video presentation;
searching the relational media database for video presentations corresponding to the user query and presenting a list of results;
receiving a user selection of a video presentation from the list of results; and
transmitting the representative frame, a portion of a subtitle track associated with the selected video presentation, and a prompt for ordering the selected video presentation.

* * * * *